United States Patent
Neubauer et al.

(10) Patent No.: US 8,261,448 B2
(45) Date of Patent: Sep. 11, 2012

(54) PULLING ROLL MATERIAL FOR MANUFACTURE OF SHEET GLASS

(75) Inventors: Dean Veral Neubauer, Horseheads, NY (US); Maurice Lacasse, Stoke (CA)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 12/905,578

(22) Filed: Oct. 15, 2010

(65) Prior Publication Data

US 2011/0023547 A1 Feb. 3, 2011

Related U.S. Application Data

(60) Continuation of application No. 11/655,478, filed on Jan. 19, 2007, now Pat. No. 7,507,194, and a division of application No. 12/368,794, filed on Feb. 10, 2009, now Pat. No. 7,842,632.

(51) Int. Cl.
*B21K 13/00* (2006.01)
*F16C 13/00* (2006.01)

(52) U.S. Cl. ............ 29/895.3; 29/895; 496/40; 496/50; 496/52; 496/53; 65/374.13

(58) Field of Classification Search ............ 492/40, 492/47, 50, 52, 53; 29/895, 895.21, 895.22, 29/895.3; 65/17.1, 245, 374.13
See application file for complete search history.

(56) References Cited

U.S. PATENT DOCUMENTS

| | | | |
|---|---|---|---|
| 1,594,417 A | 5/1924 | Kobbe | |
| 1,678,345 A | 7/1928 | Mattison | |
| 3,334,010 A | 8/1967 | Moore | 162/154 |
| 3,338,696 A | 8/1967 | Dockerty | 65/145 |
| 3,456,931 A | 7/1969 | Ermenc et al. | 263/6 |
| 3,682,609 A | 8/1972 | Dockerty | 65/83 |
| 4,244,781 A | 1/1981 | Heckman | 162/145 |
| 4,308,070 A | 12/1981 | Cavicchio | 106/93 |
| 4,341,260 A * | 7/1982 | Ishibachi et al. | 164/463 |
| 4,397,673 A | 8/1983 | Stevens | 65/374.11 |
| 4,459,148 A | 7/1984 | Diederen et al. | 65/348 |
| 4,487,631 A | 12/1984 | Britt et al. | 106/80 |
| 4,533,581 A | 8/1985 | Asaumi et al. | 428/64 |
| 5,096,857 A * | 3/1992 | Hu et al. | 501/21 |
| 5,118,544 A | 6/1992 | Delvaux et al. | 428/345 |
| 5,205,398 A | 4/1993 | Hart et al. | 198/780 |
| 5,378,219 A * | 1/1995 | Hart et al. | 492/48 |
| 5,709,639 A | 1/1998 | Hart et al. | 492/48 |
| 5,989,170 A | 11/1999 | Hart et al. | 492/48 |
| 6,896,646 B2 | 5/2005 | Kaiser et al. | 492/40 |
| 7,051,554 B2 | 5/2006 | Hart | 65/370.1 |
| 7,284,328 B2 | 10/2007 | Kaiser | 29/895.21 |
| 7,507,194 B2 * | 3/2009 | Neubauer et al. | 492/40 |
| 7,842,632 B2 * | 11/2010 | Neubauer et al. | 501/95.1 |
| 2004/0192526 A1 * | 9/2004 | Nakayama et al. | 492/40 |
| 2004/0220032 A1 | 11/2004 | Nakayama et al. | |
| 2007/0042883 A1 | 2/2007 | Daily et al. | 492/40 |
| 2009/0272151 A1 * | 11/2009 | Lacasse et al. | 65/374.13 |
| 2010/0113238 A1 * | 5/2010 | Horiuchi et al. | 492/40 |
| 2010/0218559 A1 * | 9/2010 | Bucko et al. | 65/253 |

FOREIGN PATENT DOCUMENTS

| | | |
|---|---|---|
| JP | 58-156717 | 9/1983 |
| JP | 05-99574 | 4/1993 |
| JP | 05-124826 | 5/1993 |
| JP | 05-99574 A5 | 1/1994 |
| JP | 06-279834 | 10/1994 |
| JP | 2000-304452 | 2/2000 |
| JP | 2000128557 A * | 5/2000 |
| JP | 2000-169170 | 6/2000 |
| JP | 2008215664 A * | 9/2008 |

OTHER PUBLICATIONS

Material Safety Data Sheet, "Tombo # 6710-G NA Millboard for Disk Rollers SD-115", Nichias Corporation, Aug. 18, 1998.
Akase, Masazumi, NA Disc Roll for Stainless, Nichias Technological Review, 1993, No. 1.; pp. 10-15.

* cited by examiner

*Primary Examiner* — Essama Omgba
(74) *Attorney, Agent, or Firm* — Thomas R. Beall; Kevin M. Able

(57) ABSTRACT

A method of making sheet glass using a pulling roll comprised of a high-temperature millboard material. The millboard comprises aluminosilicate refractory fiber, silicate, mica, and kaolin clay. A method of manufacturing a pulling roll is disclosed, together with a roll produced by the methods disclosed herein. The method comprises forming a pulling roll and densifying at least a portion of the pulling roll by exposing to the pulling roll to high temperatures.

6 Claims, No Drawings

PULLING ROLL MATERIAL FOR MANUFACTURE OF SHEET GLASS

CROSS-REFERENCE TO RELATED APPLICATIONS

The present application is a continuation application of U.S. patent application Ser. No. 11/655,478, filed on Jan. 19, 2007, now allowed as U.S. Pat. No. 7,507,194, which, in turn, is a divisional application of U.S. patent application Ser. No. 12/368,794, filed on Feb. 10, 2009, now allowed as U.S. Pat. No. 7,842,632, the contents of both of which are relied upon and incorporated herein by reference in their entirety.

TECHNICAL FIELD

The present invention relates to the manufacture of sheet glass. More particularly, the present invention relates to millboard materials and pulling rolls for use in the manufacture of sheet glass by, for example, the overflow downdraw fusion process.

BACKGROUND

Pulling rolls are used in the manufacture of sheet glass to apply tension to the ribbon of glass from which the sheets are formed and thus control the nominal sheet thickness. For example, in the overflow downdraw fusion process (see Dockerty, U.S. Pat. Nos. 3,338,696 and 3,682,609), pulling rolls are placed downstream of the tip or root of the fusion pipe and are used to adjust the rate at which the formed ribbon of glass leaves the pipe and thus determine the nominal thickness of the finished sheet.

A successful pulling roll needs to meet a number of conflicting criteria. First, the roll needs to be able to withstand the high temperatures associated with newly formed glass for substantial periods of time. The longer a roll can last in such an environment the better, since roll replacement reduces the amount of finished glass a given machine can produce and thus increases the ultimate cost of the glass.

Second, the roll must be able to produce sufficient pulling force to control glass thickness. In order not to damage the central portion of the ribbon that becomes the usable finished glass, the roll can only contact the ribbon over a limited area at its edges. Thus, the required pulling forces must be generated using only this area. However, the forces applied to the glass cannot be too large since this can create surface damage which can propagate into the usable central portion of the ribbon. Accordingly, the roll must achieve a balance between applying too little and too much force to the edge regions of the glass.

Third, the millboard material used in the construction of pulling rolls must be hard enough to resist process damage due to broken glass during production for extended periods of time.

Fourth, the pulling roll must not give off excessive amounts of particles, which can adhere to the glass and form surface defects known as onclusions. For glass that is to be used in demanding applications, such as substrates for flat panel displays, onclusions must be kept to very low levels since each onclusion will typically represent a defective region of the finished product (e.g., one or more defective pixels). Because of the hot environment in which pulling rolls operate, providing materials that can apply sufficient pulling forces to a glass ribbon and yet not give off particles when hot is a difficult challenge.

Pulling rolls are preferably designed to contact the glass ribbon at its outer edges, specifically, in regions just inboard of the thickened beads that exist at the very edges of the ribbon. A preferred construction for such rolls employs discs of a heat resistant material, such as millboard, which are mounted on a driven shaft. Examples of this construction can be found in Moore, U.S. Pat. No. 3,334,010, Asaumi et al., U.S. Pat. No. 4,533,581, and Hart et al., U.S. Pat. No. 5,989,170, which are incorporated by reference in their entirety and for the specific purpose of describing examples of construction for pulling rolls.

Millboard materials have been used commercially for many years as thermal insulation in gaskets, linings for fire-safe cabinets, and in the glass making industry as float roll covering materials. Early millboard compositions, such as those described in U.S. Pat. Nos. 1,594,417, 1,678,345, and 3,334,010, often contained cement binders and asbestos fibers to strengthen the resulting millboard and provide heat resistance in high-temperature applications. Health concerns related to the use of asbestos led to the development of asbestos-free millboard materials. U.S. Pat. No. 4,244,781, for example, discloses a millboard composition containing ceramic and organic fibers, pyrophyllite, and an inorganic binder. Similarly, U.S. Pat. No. 4,308,070 discloses a millboard containing a combination of cellulose fiber, barium sulphate, cement, and inorganic fiber.

Millboards comprised of washed ceramic fiber and incorporating various fillers and functional components have also been used as roll coverings for float line rolls in the manufacture of glass. These washed ceramic materials frequently contain approximately twenty or more percent of unfiberized material, or shot, of a size less than 100 mesh (0.0059 inches). This unfiberized material can cause microscopic defects in the glass sheet as it passes over the float line rolls. Once the binder is removed, these millboard materials can also become dusty and potentially create onclusions on the glass sheets.

Existing pulling rolls have not been able to fully satisfy the competing criteria of long high temperature life, controlled force application, hardness, and low contamination. Thus, there is a need in the art to obtain a pulling roll that achieves higher levels of such performance than existing pulling rolls.

SUMMARY

The present invention relates to pulling rolls for glass manufacture, and more particularly to millboard materials used in the manufacture of pulling rolls.

In a first aspect, the present invention provides a pulling roll for glass manufacture comprising at least one millboard piece, wherein the at least one millboard piece comprises: from about 5 to about 30 parts by weight aluminosilicate refractory fiber; from about 10 to about 30 parts by weight silicate; from about 5 to about 25 parts by weight mica; and from about 10 to about 35 parts by weight kaolin clay; wherein the combination of a, b, c, and d comprise at least 85 weight percent of the millboard piece.

In a second aspect, the present invention provides a method for manufacturing a pulling roll, comprising providing at least one millboard piece in the form of a pulling roll, comprising from about 5 to about 30 parts by weight aluminosilicate refractory fiber; from about 10 to about 30 parts by weight silicate; from about 5 to about 25 parts by weight mica; and from about 10 to about 35 parts by weight kaolin clay; wherein the combination of a, b, c, and d comprise at least 85 weight percent of the millboard; and densifying at least a portion of the millboard piece by exposing the millboard piece to a temperature of from about 650° C. to about 1,000° C.

In a third aspect, the present invention provides a millboard comprising from about 5 to about 30 parts by weight aluminosilicate refractory fiber; from about 10 to about 30 parts by weight silicate; from about 5 to about 25 parts by weight mica; and from about 10 to about 35 parts by weight kaolin clay; wherein the combination of a, b, c, and d comprise at least 85 weight percent of the millboard.

In still another aspect, the present invention provides a pulling roll produced by the methods of the present invention.

In still another aspect, the present invention provides a pulling roll wherein at least a portion of the pulling roll comprises mullite.

In still another aspect, the present invention provides a pulling roll wherein at least a portion of the pulling roll comprises cristobalite.

Additional aspects of the invention will be set forth, in part, in the detailed description and any claims that follow, and in part will be derived from the detailed description, or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

DETAILED DESCRIPTION

The present invention can be understood more readily by reference to the following detailed description, examples, and claims, and their previous and following description. However, before the present articles and/or methods are disclosed and described, it is to be understood that this invention is not limited to the specific articles and/or methods disclosed unless otherwise specified, as such can, of course, vary. It is also to be understood that the terminology used herein is for the purpose of describing particular aspects only and is not intended to be limiting.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

The following description of the invention is provided as an enabling teaching of the invention in its currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "millboard" includes aspects having two or more such millboards, unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and concluding claims to parts by weight, of a particular component in a composition or article, denote the weight relationship between the component and any other components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein, a "wt. %" or "weight percent" or "percent by weight" of a component, unless specifically stated to the contrary, is based on the total weight of the composition in which the component is included.

"Shot" refers to unfiberized material.

"Mullite" is a term known to those of skill in the art and refers to a natural or synthetic form of aluminum silicate that is stable at temperatures as high as 1600° C. and exhibits a low thermal expansion coefficient and good mechanical strength.

"Cristobalite" is a term known to those of skill in the art and refers to a form of silica stable between 1,470° C. and its melting point of 1,728° C. As used herein, cristobalite also includes a variation of cristobalite known as high-cristobalite, which occurs above 268° C. but is only stable above 1,470° C. and which can crystallize and persist metastably at lower temperatures.

As used herein, "compressibility" refers to the relative volume change of a material as a response to an applied pressure. For example, compressibility of a pulling roll refers to the change in thickness of the assembled millboard pieces, or length of the assembled pulling roll, upon application of a compressive axial force.

As used herein, "recovery" refers to the ability of a compressed material to expand after removal of an applied pressure. For example, recovery of a pulling roll refers to the expansion in thickness of millboard pieces upon either removal of an axial compressive force or upon elongation of the pulling roll shaft by, for example, thermal expansion.

As briefly introduced above, the present invention provides an improved pulling roll that, for example, can be useful in the manufacture of sheet glass. Among other aspects described in detail below, the invention comprises the use of millboard material containing aluminosilicate refractory fiber, silicate, mica, and kaolin clay, in the manufacture of sheet glass.

Millboard

Millboard materials are often used as thermal insulation materials in various industries, including glass manufacture. Millboard articles are typically produced by creating a slurry of the desired components, using a rotating screened cylinder to effect uptake and dewatering of the components, transferring the dewatered components to a synthetic felt and then to an accumulator roll, where layers of the slurry are accumulated upon one another to a desired thickness. These accumulated layers can be slit, removed, and formed into flat sheets of desired dimensions for subsequent use. After and during forming, the millboard sheet can be compressed by rollers to give it a uniform thickness. The resulting millboard sheet can subsequently be heated to remove residual moisture. U.S. Pat. Nos. 1,594,417, 1,678,345, 3,334,010, 4,487,631, and 5,989,170, describe various compositions and methods for millboard manufacture, and are incorporated by reference in their entirety and for the specific purpose of describing methods of manufacture for millboard articles. One of skill in the art could readily determine appropriate process conditions for the manufacture of a millboard article.

Aluminosilicate Refractory Fiber

In one aspect, the aluminosilicate refractory fiber is any refractory fiber comprised substantially of an aluminosilicate material. Naturally occurring or synthetic refractory fiber can be used. Specifically, refractory fiber derived from kaolinite or kaolin based materials can be used. In another aspect, the naturally occurring refractory fiber derived from a kaolin based material can contain impurities such as iron oxide, titanium dioxide, and sodium oxide. In one aspect, the refractory fiber of the present invention can have a length of, for example, up to 5 microns, a diameter of, for example, up to 3 microns, and an aspect ratio of, for example, 5 to 1. It is preferable that the refractory fiber is substantially free of shot, or unfiberized material. It is preferable that the refractory fiber not melt at temperatures up to about 1,760° C., and retain physical and chemical integrity when subjected to continuous temperatures of up to about 1,260° C. The refractory fiber can be a FIBERFRAX® material, for example, FIBERFRAX® 6000, available from Unifrax Corporation, Niagara Fall, N.Y., USA, which is derived from kaolin and is comprised of from about 45% to about 51% alumina, from about 46% to about 52% silica, less than about 1.5% iron oxide, less than about 2% titanium dioxide, less than about 0.5% sodium oxide, has an average fiber diameter of about 1.5 to about 2.5 microns, and contains from about 45% to about 55% fiberized material. One of skill in the art could readily choose an appropriate aluminosilicate refractory fiber.

The aluminosilicate refractory fiber can be from about 5 to about 30 parts by weight, preferably from about 10 to about 30 parts by weight, and more preferably from about 20 to about 30 parts by weight of the combination of aluminosilicate refractory fiber, silicate, mica, and kaolin clay, for example, about 5, 6, 8, 10, 15, 20, 25, 26, 28, 29, or 30 parts by weight of the above combination. Expressed in weight percent of the total composition, the refractory fiber can be from about 5.5 to about 33.3 weight percent, preferably from about 11.3 to about 33.3 weight percent, and more preferably from about 22.6 to about 33.3 weight percent, for example, 5.5, 7, 10, 15, 20, 25, 27, 30, or 33.3 weight percent of the total millboard composition.

Silicate

The silicate can be a magnesium silicate, a rock wool, or a combination thereof. Naturally occurring or synthetic silicate material can be used. The silicate can be a forsterite mineral or a synthetic forsterite obtained by calcination of chrysotile asbestos fibers. It is preferable that the silicate be a magnesium silicate, such as a FRITMAG™ magnesium silicate, available from 4372077 Canada Inc., Sherbrooke, Qc, Canada. Alternatively, the silicate can be a sepiolite magnesium silicate. If the silicate is a sepiolite magnesium silicate, precautions should be taken as this material can contain asbestos fibers. One of skill in the art could readily choose an appropriate silicate material.

The silicate can be from about 10 to about 30 parts by weight, preferably from about 15 to about 25 parts by weight, and more preferably from about 15 to about 20 parts by weight of the combination of aluminosilicate refractory fiber, silicate, mica, and kaolin clay, for example, about 10, 11, 12, 15, 16, 17, 20, 25, or 30 parts by weight of the above combination. Expressed in weight percent, the silicate can be from about 11.1 to about 33.3 weight percent, preferably from about 16.9 to about 28.2 weight percent, and more preferably from about 16.9 to about 22.6 weight percent, for example, 11.1, 15, 20, 25, 27, 30, or 33.3 weight percent of the total millboard composition.

Mica

The mica can be any phyllosilicate of the mica group that is a sheet silicate in the form of parallel sheets of silicate tetrahedral, with either $Si_2O_5$ or a 2 to 5 ratio, for example, biotite, muscovite, lepidolite, phlogopite, or illite. In one aspect, the mica is a high surface area mica that is substantially free if impurities and exhibits thermal stability, low ignition loss, and is inert. The mica is preferably a phlogopite flake mica, such as SUZORITE® 325-S, available from Suzorite Mica Products, Inc. (Suzor Township, Quebec, Canada). One of skill in the art could readily choose an appropriate mica material.

The mica can be from about 5 to about 25 parts by weight, preferably from about 10 to about 25 parts by weight, and more preferably from about 15 to about 25 parts by weight of the combination of aluminosilicate refractory fiber, silicate, mica, and kaolin clay, for example, about 5, 6, 8, 10, 15, 20, 21, 22, 24, or 25 parts by weight of the above combination. Expressed in weight percent, the mica can be from about 5.5 to about 27.8 weight percent, preferably from about 11.3 to about 27.8 weight percent, and more preferably from about 16.9 to about 27.8 weight percent, for example, 5.5, 7, 9, 15, 19, 25, 27, or 27.8 weight percent of the total millboard composition.

Kaolin Clay

The kaolin clay can be any kaolin or china clay material, such as kaolinite. The kaolin clay is preferably intermediate grained air-floated Kaolin clay, such as Allen clay, available from Kentucky-Tennessee Clay Co., Sandersville, Ga., USA. One of skill in the art could readily choose an appropriate kaolin clay.

The kaolin clay can be from about 10 to about 35 parts by weight, preferably from about 20 to about 35 parts by weight, and more preferably from about 25 to about 35 parts by weight of the combination of aluminosilicate refractory fiber, silicate, mica, and kaolin clay, for example, about 10, 11, 13, 20, 25, 30, 31, 32, or 35 parts by weight of the above combination. Expressed in weight percent, the kaolin clay can be from about 11.1 to about 39.5 weight percent, preferably from about 22.6 to about 39.5 weight percent, and more preferably from about 28.2 to about 39.5 weight percent, for example, 11.1, 13, 15, 20, 30, 33, 38, or 39 weight percent of the total millboard composition.

Other Materials

The millboard material can further comprise a functional component. In one aspect, the functional component comprises a cellulose material, a starch material, a colloidal silica, or a mixture thereof. Functional components can be useful in the formation of millboard articles. A functional component can combust or decompose during heating or use of a millboard article at typical pulling roll operating temperatures. In one aspect, a functional component can be a processing aid, such as a processed wood pulp cellulose fiber. A functional component can also be a binder, such as a cationic potato starch, for example, Empresol N, available from American Key Products, Inc, Kearney, N.J., USA, or a colloidal silica, such as an alkaline colloidal silica solution, for example, LUDOX®-Nalco 1140, available from Nalco Chemical Co., Naperville, Ill., USA.

A functional component can be up to about 15 weight percent of the millboard material.

It is preferable that the millboard material is substantially free of asbestos, unfiberized material, and small crystalline silica particles. The millboard material preferably contains less than about 0.5 weight percent, more preferably less than about 0.1 weight percent, and most preferably is free of crystalline silica. The millboard material also preferably contains less than about 0.8 weight percent, more preferably less than about 0.3 weight percent, and most preferably is free of titanium dioxide.

Overall Millboard Composition

The millboard of the present invention is comprised of from about 5 to about 30 parts by weight aluminosilicate refractory fiber; from about 10 to about 30 parts by weight silicate; from about 5 to about 25 parts by weight mica; and from about 10 to about 35 parts by weight kaolin clay; wherein the combination of the aluminosilicate refractory, silicate, mica, and kaolin clay comprise at least 85 weight percent of the millboard piece, preferably at least 95 weight percent of the millboard piece. The overall millboard composition can further comprise a functional component as described above. The functional component can combust or decompose during heating to temperatures typical for pulling roll operation and glass manufacture, affecting the percentage of individual components in the overall millboard composition. Weight loss due to combustion or decomposition of functional component can be from about 0 to about 15 weight percent. In one aspect, the millboard composition loses from about 8 to about 15 weight percent upon heating. In another aspect, the millboard composition loses about 10 weight percent during heating.

In one aspect, a preferred millboard composition, after heating, comprises from about 20 to about 30 weight percent, preferably about 26 weight percent aluminosilicate refractory fiber; from about 10 to about 20 weight percent, preferably about 15 weight percent silicate; from about 14 to about 25 weight percent, preferably about 20 weight percent mica; from about 28 to about 35 weight percent, preferably about 31 weight percent kaolin clay, and from about 5 to about 10 weight percent, preferably about 8 weight percent LUDOX®.

In one aspect, a preferred millboard composition has a temperature resistance of greater than about 1,000° C.

The compressibility of a pulling roll is dependent upon the density of the millboard pieces from which the pulling roll is formed. It is desirable that a pulling roll, and thus the millboard material, exhibit low compressibility, for example, between about 15 and about 30 percent at 25° C., and less than 5 percent at about 110° C. It is also desirable that a millboard material exhibit high recovery, for example, greater than about 30 percent, preferably greater than about 40 percent. Millboard materials possessing such recovery percentages can expand upon removal of the axial compressive force placed on a pulling roll or upon elongation of the pulling roll shaft as a result of thermal expansion, thus preventing separation of the millboard pieces that form the pulling roll.

In contrast, a commercially available millboard material, Nichias SD-115, available from Nichias Corporation, Tokyo, Japan, is believed to be comprised of 10-20 percent refractory ceramic fiber, 40-50 percent mica, and 40-50 percent clay. The Nichias SD-115 material has a temperature resistance of only about 800° C., a weight loss upon heating of 14-16%, compressibility at 25° C. of 10-17%, and a recovery at 760° C. of 35-40%.

As described here and in the examples below, the inventive millboard exhibits a higher temperature resistance, a lower weight loss upon heating, and/or a higher recovery at 760° C.

Pulling Roll

A pulling roll, for use in the manufacture of sheet glass, can be produced from a millboard, as described above. The millboard can be cut into pieces and the pieces mounted on a shaft in face-to-face contact. The outer surface of each piece forms a portion of the exterior surface of the pulling roll. At least a portion of the exterior surface of the pulling roll can be adapted to contact the glass sheet. The portion of the pulling roll adapted to contact the glass sheet typically has a Shore D hardness at room temperature of between 30 and 55, preferably between 40 and 55.

It should be appreciated that a variety of pulling roll configurations exist in the literature and are suitable for use in the manufacture of sheet glass. U.S. Pat. No. 6,896,646 describes pulling rolls for glass sheet manufacture, and is incorporated by reference in entirety and for the specific purpose of describing methods of producing a pulling roll from millboard materials. The present invention is not limited to a particular pulling roll configuration or arrangement, and one of skill in the art could readily choose an appropriate pulling roll configuration.

In a typical configuration, a pair of pulling rolls engage a glass sheet formed by an overflow downdraw process, wherein at least a portion of the outer surface of the pulling rolls contacts the glass sheet. A pulling roll can also include a shaft, which can carry a plurality of millboard pieces held in place by collars that can apply an axial compressive force to the millboard pieces when affixed to the shaft. An assembled pulling roll can include a bearing surface positioned on at least one end of the shaft. A pulling roll can also include a portion specifically adapted for contacting a glass sheet, wherein the exterior surface of the pulling roll extends a further distance from the shaft than does the surrounding portion of the pulling roll. Such a configuration can reduce the possibility of particles from the pulling roll becoming deposited on the glass sheet as conclusions.

The millboard pieces can be pre-fired prior to assembly to form the pulling roll so that they exhibit substantially no compositional or dimensional changes when exposed to the temperatures at which the rolls operate. For example, millboard pieces can be heated in a pre-firing step to a temperature of from about 650° C. to about 1,000° C., preferably from about 760° C. to about 1,000° C., and held for a period of at least two hours. The millboard pieces can then be cooled to ambient temperature and assembled to form a pulling roll. Functional components present in the millboard material, such as cellulose, can be combusted by heating in such a pre-firing step. Alternatively, the pulling roll can be used without a pre-firing step. If the millboard material from which the pulling roll is formed comprises combustible functional components, the compressive forces used to assemble the pulling roll can require adjustment to compensate for the combusted functional component. Other pre-firing times and temperatures can, of course, be used in the practice of the invention so long as they provide a finished pulling roll whose composition is stable at the rolls' operating temperature.

Densification and Formation of Mullite and/or Cristobalite

One aspect of the inventive pulling roll is that it is sufficiently hard to resist process damage, such as broken glass due to checks during production for extended periods of time. Sideways movement of the glass during production is often related to separation of the millboard pieces that comprise the pulling roll. Checks, or embedded glass particles in the surface of a pulling roll can occur when softer millboard materials are employed. Upon exposure to operating temperatures, for example, from about 650° C. to about 1,200° C., a portion of the pulling roll densifies, wherein the density of that portion of the roll is greater than that of the pulling roll as originally formed. Initially, densification can occur at the outer surface of the pulling roll in contact with the glass, or in various geometries, as determined by the pulling roll configuration and the specific glass manufacturing conditions and temperatures. The rate of densification over time is based on the temperatures to which the pulling roll is exposed. Densification can be measured via Shore D hardness values at the pulling roll surface using commercially available equipment such as a durometer. It is preferable that the portion of the pulling roll that will contact the glass sheet be harder than traditional millboard and pulling roll materials, and thus more resistant to process damage and embedded glass.

Upon further exposure to temperatures of about 1,000° C. and greater, a portion of the pulling roll can form mullite, cristobalite, or a combination thereof. The portion of the pulling roll that can form mullite and/or cristobalite can vary depending on the configuration of the pulling roll and the temperatures to which the roll is exposed, but will typically be the exterior portion of the pulling roll. It is preferable that the portion of the pulling roll that will contact the glass sheet also form a mullite layer, a cristobalite layer, or a combination layer comprising mullite and cristobalite.

Densification and formation of mullite is beneficial to the performance of a pulling roll. Pulling rolls that are sufficiently hard to resist process damage have been found to achieve longer service lives than traditional pulling rolls, without requiring the application of excessive force to the glass sheet and without generating high levels of particulate contamination. The inventive pulling roll can achieve a service life of from 40 to in excess of 100 days, preferably in excess of 75 days, and most preferably in excess of 100 days.

The pulling roll of the present invention can satisfy one or more of the demanding requirements described above. It is not necessary that the pulling roll of the present invention simultaneously satisfy all of the recited requirements. In one aspect, densification and/or formation of mullite can allow the pulling roll to withstand the high temperatures associated with glass formation and provide a longer service life. In another aspect, densification and/or formation of cristobalite can allow the pulling roll to withstand the high temperatures associated with glass formation and provide a longer service life. In another aspect, the surface of the pulling roll of the present invention can apply pulling forces sufficient to control glass sheet thickness. In yet another aspect, the composition of the pulling roll is sufficiently hard to resist process damage due to broken glass and does not give off excessive particles that can create onclusions on glass sheets manufactured by a downdraw process.

EXAMPLES

To further illustrate the principles of the present invention, the following examples are put forth so as to provide those of ordinary skill in the art with a complete disclosure and description of how the millboard pulling rolls and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations can occur. Unless indicated otherwise, parts are parts by weight, temperature is ° C. or is at ambient temperature, and pressure is at or near atmospheric.

The exemplified pulling roll articles were evaluated for relevant physical and performance properties, such as for example, hardness, compressibility, and recovery.

Example 1

Inventive Millboard A

In a first example, a millboard material was produced from the components set forth in Table 1 below, using traditional fabrication techniques.

TABLE 1

| Inventive Millboard A | |
|---|---|
| Wt. Percent | Component |
| 1.5 | Cellulose fiber |
| 24.5 | FIBERFRAX ® 6000 Refractory Fiber |
| 15.0 | Fritmag magnesium silicate |
| 19.0 | SUZORITE ® 325-S mica |
| 30.0 | Kaolin (Allen) Clay |
| 2.5 | Empresol N starch |
| 7.5 | LUDOX ® colloidal silica |

A piece of the inventive millboard produced above was subsequently analyzed at two temperatures for density, thickness, hardness, and compression. The results of this analysis are summarized in Table 2 below. Hardness values were determined using according to ASTM D2240 with a Shore durometer, available from Wilson Instruments, Norwood, Mass., USA. Compressibility and recovery values were determined according to ASTM F36.

TABLE 2

| Physical Properties of Inventive Millboard A | | | |
|---|---|---|---|
| Temperature | Units | 110° C. | 760° C. |
| Density | g/cm$^3$ | 1.006 | 0.974 |
| Thickness | mm | 6.01 | 5.85 |
| Hardness | Shore D | 48 | 35 |
| Compressibility | % | 4.57 | 12.67 |
| Recovery | % | 45.22 | 40.31 |

An examination of the data set forth in Table 2 indicates, in particular, that the millboard composition exhibits a Shore D hardness value sufficiently high to provide advantages in handling and processing glass sheet without incurring process damage due to broken glass. In addition, the low compressibility and high recovery rate of the inventive millboard material suggest that it is well suited for use in a pulling roll. The high recovery rate indicates that the compressed millboard material can act as a spring against the collar of a pulling roll during fabrication and at operating temperatures.

Example 2

Comparative Millboard

In a second example, Inventive Millboard A was compared to a Nichias SD-115 material. Table 3 details the typical range of physical properties for both the Inventive Millboard A and the Nichias SD-115 material.

TABLE 3

Comparison of Inventive Millboard A and Nichias SD-115

| Property | Inv. Millboard A | Nichias SD-115 |
| --- | --- | --- |
| Temperature Resistance | ≧1000° C. | 800° C. |
| Weight Loss upon firing at 760° C. | 10.9-14.4% | 14.0-16.0% |
| Incremental Weight Loss, 650° C. to 1,000° C. | 0.3 % | 1.8% |
| Shore D Hardness at 25° C. | 34-49 | 35-50 |
| Compressibility at 110° C. | 4.2-15.1% | 10-12% |
| Recovery at 760° C. | 30.1-43.4% | 35-40% |

As detailed in Table 3 above, Inventive Millboard A exhibits a higher temperature resistance than the comparative Nichias SD-115 material. The inventive millboard also exhibits a lower weight loss upon firing of punched millboard discs at 760° C. The incremental weight loss between 650° C. and 1,000° C., as determined by thermogravimetric analysis, is indicative of the amount of material lost to combustion or decomposition during operation of a pulling roll. Materials having higher incremental weight losses will typically require adjustment of the compression of a pulling roll to prevent disc separation. Alternatively, materials exhibiting high recovery can expand to fill the volume lost to combustion, decomposition, or upon elongation of the pulling roll shaft by, for example, thermal expansion. The inventive millboard advantageously exhibits a substantially lower incremental weight loss, together with a higher recovery value. The inventive millboard also has a lower compressibility than the SD-115 material, indicating that it is more suitable for use in producing a pulling roll.

Example 3

Inventive Pulling Roll

In a third example, pulling rolls manufactured from inventive Millboard A and from a commercially available millboard material, Nichias SD-115, were used in the manufacture of sheet glass. Glass sheet production runs were conducted using the inventive pulling roll and the comparative Nichias pulling roll for 24 hours. The results of the experimental production runs are detailed in Table 4 below:

TABLE 4

Glass Sheet Production Runs

|  | Inventive Millboard A | Nichias SD-115 |
| --- | --- | --- |
| Select Sheets, % | 97.7 | 94.5 |
| Checks/Cracks, % | 0 | 1.1 |
| Sheet Thickness | Similar | Similar |
| Length of Run | 24 hours | 24 hours |
| Stress, Range Max | 109.42 | 135.19 |
| Absolute Max | 97.60 | −107.33 |
| 200 mm Range Max | 95.75 | 104.74 |

As indicated in Table 4, the pulling roll fabricated from Inventive Millboard A performed well in the sheet glass production run. The term select sheets, as used in Table 4, refers to sheet glass pieces passing quality control standards and that are suitable for distribution. The production run using the Inventive Millboard A pulling roll generated a significantly higher percentage of select sheets than the comparable run using the Nichias pulling roll. Additionally, the Inventive Millboard A pulling roll did not generate any glass sheet containing checks or cracks, while the Nichias pulling roll generated 1.1% glass sheets containing checks or cracks. Thickness of the sheet glass produced from both pulling rolls was comparable.

The increased production of select sheets and lower level of production defects, i.e. checks/cracks, represent significant commercial advantages for the pulling roll fabricated from the inventive millboard material of the present invention. Table 4 also illustrates the reduced stress applied to the glass sheet from the inventive pulling roll. Stress is measured along all four edges of the sheet, so some common metrics for analyzing this data are shown in Table 4. Since stress can be either positive or negative, it is typical for the data to be evaluated based on absolute values, ranges of values, and maximum of values (worst case scenario). Low stress is considered to be good and customers typically dictate the range of stress they can tolerate.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

The invention claimed is:

1. A method of making a sheet glass using a pulling roll comprising at least one millboard piece, wherein the at least one millboard piece comprises:
   a. from about 5 to about 30 parts by weight aluminosilicate refractory fiber, said aluminosilicate refractory fiber having a length up to 5 microns;
   b. from about 10 to about 30 parts by weight silicate;
   c. from about 5 to about 25 parts by weight mica; and
   d. from about 10 to about 35 parts by weight kaolin clay;
   wherein the combination of a, b, c, and d comprise at least 85 weight percent of the millboard piece.

2. A method of claim 1, wherein at least a portion of the pulling roll comprises mullite.

3. A method of claim 1, wherein at least a portion of the pulling roll comprises cristobalite.

4. A method of claim 1, wherein at least a portion of the outer surface of the pulling roll comprises mullite, and wherein the mullite portion of the outer surface is positioned to contact a glass sheet.

5. A method of claim 1, wherein at least a portion of the outer surface of the pulling roll comprises cristobalite, and wherein the cristobalite portion of the outer surface is positioned to contact a glass sheet.

6. A method of claim 1, which is a fusion down-draw process.

* * * * *